US008477787B2

(12) United States Patent
Hunkeler et al.

(10) Patent No.: US 8,477,787 B2
(45) Date of Patent: Jul. 2, 2013

(54) METHOD FOR ROUTING OF MESSAGES WITHIN A DATA NETWORK

(75) Inventors: Urs Hunkeler, Rueschlikon (CH); Hong Linh Truong, Rueschlikon (CH); Beat Weiss, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 251 days.

(21) Appl. No.: 12/956,096

(22) Filed: Nov. 30, 2010

(65) Prior Publication Data

US 2011/0128962 A1 Jun. 2, 2011

(30) Foreign Application Priority Data

Nov. 30, 2009 (EP) ..................................... 09177521

(51) Int. Cl.
*H04L 12/56* (2006.01)
(52) U.S. Cl.
USPC .......................................... 370/393; 709/242
(58) Field of Classification Search
None
See application file for complete search history.

(56) References Cited

U.S. PATENT DOCUMENTS

2005/0157698 A1*  7/2005  Park et al. ..................... 370/351
2007/0263628 A1* 11/2007  Axelsson et al. ............. 370/392
2010/0265955 A1* 10/2010  Park et al. ..................... 370/400

OTHER PUBLICATIONS

Blazevic, L. et al, "A Location-Based Routing Method for Mobile Ad Hoc Networks". IEEE Transactions on Mobile Computing, Mar.-Apr. 2005, vol. 4, Issue: 2. pp. 97-110.
Siddiqui, M. et al, "HRP: A Hybrid Routing Protocol for Wireless Mesh Network". Publications of Networking Lab, Kyung Lee University.

* cited by examiner

*Primary Examiner* — Yemane Mesfin
*Assistant Examiner* — Khoa Huynh
(74) *Attorney, Agent, or Firm* — Gail H. Zarnick; Anne Vachon Dougherty

(57) ABSTRACT

A data network includes a plurality of source nodes, at least one sink node, and at least one intermediate node, wherein routing of a reverse message from the sink node to a source node via at least one intermediate node is performed by the intermediate node using reverse path routing information data comprising a combination of source routing information data and transparent bridging information data, wherein the reverse path routing information data is constructed during propagation of a forward message from the source node to the sink node via the intermediate node.

12 Claims, 4 Drawing Sheets

METHOD FOR ROUTING OF MESSAGES WITHIN A DATA NETWORK

FIELD OF THE INVENTION

The invention relates to a method for routing messages in a data network and in particular to routing of reverse messages from a sink node to a source node via intermediate nodes of the network.

BACKGROUND OF THE INVENTION

A data network comprises network nodes which can communicate with each other by exchanging messages. Such a data network can comprise a plurality of nodes which are connected with each other via wired or wireless links. Messages from a source node to a sink node are routed through intermediate nodes of the network by using a routing protocol. A many-to-one communication is a common requirement in some network applications, in particular in sensor network applications in which sensor nodes exchange information data with a sink node only and not between themselves. The sensor data collected by the sensor nodes are sent to the sink node which can in, some cases, be a base station with access to a network such as the internet. The opposite direction from the sink node to the sensor node is used to send control information from the sink node to the sensor nodes. Messages sent by the sensor nodes to the sink node are forwarded by means of a forward routing protocol such as the collection tree protocol CTP or by means of a gradient routing protocol as used, for instance, in ad hoc networks.

For the construction of a reverse path to route the messages originating from the sink node to the sensor nodes, conventional routing protocols are known from the prior art. A transparent bridging routing method is described in Andrew S. Tanenbaum, *Computer Networks*, Prentice Hall, New Jersey, 1996. A Transparent bridge learns the location of a work station by analyzing a source address in incoming messages. For example, if a bridge receives a message sent by a station A on port i it can assume that station A can be reached via port i. Consequently, this bridge or network node will forward all messages destined to a station A via that port i. For the forwarding of messages the respective intermediate node of the network can maintain a forwarding table. Every time an intermediate node of the network forwards a message to the sink node it stores the address of the source node together with the address of the sending node in its forwarding table. The intermediate node of the network then uses the information stored in this forwarding table to route messages sent by the sink node back to their destinations, source nodes or sensor nodes. Although this conventional routing method is quite simple and can be implemented fairly easily on a sensor device, it does not scale with the number of nodes within a data network because the size of the forwarding table has to grow with the number of source nodes that an intermediate node has to learn. This poses a problem in particular for intermediate nodes that are located close to the sink node and have to store a very large number of source node addresses in their respective forwarding tables. Therefore, this conventional transparent bridging method requires a memory with a large size for each intermediate node within the data network.

Another known approach that can be used for the construction of a reverse path from the sink node to the source nodes is the so-called source routing (or SR) used for example by the ZigBee alliance in its 2008 ZigBee specification, Jan. 17, 2008, ZigBeedocument 053474r17. In the source routing method, no forwarding table is employed. Instead, every time an intermediate node of the network forwards a message to the sink node, it appends its node address into the source route SR data field of the respective message. When the message arrives at the sink node, the source route SR field contains the addresses of all intermediate nodes that are located on the route from the source node to the sink node. The sink node can then use this route information to send a message back to the source node. Since there is no forwarding table to be maintained by the nodes of the network, this method can be applied in networks which have a very large number of nodes. However, this conventional source route routing method has the drawback that a per-message overhead is introduced by the source routing field which is increased with every hop of the message from one node to the next node. A message overhead is present for every forwarded message and limits the number of hops a message is allowed to traverse before reaching the destination node. This limitation is an issue, in particular for wireless sensor networks because the employed messages therein normally have a very small maximum message length.

SUMMARY OF THE INVENTION

It is an object of the present invention to provide an efficient method for routing a reverse message from a sink node to a source node of a data network, in particular a routing method which overcomes at least some of the drawbacks of conventional routing methods.

The invention provides a method for routing a reverse message from a sink node to a source node via at least one intermediate node of a network depending on a reverse path routing information data comprising a combination of source routing information data and transparent bridging information data, wherein the reverse path routing information data is constructed during propagation of a forward message from the source node to the sink node via said intermediate node.

Accordingly, the present invention provides a reverse path determination or routing method which combines the strengths of both the transparent bridging method and the source routing method, yet without suffering from all of their respective weaknesses. The method according to the present invention employs source routing to support a large number of network nodes and combines it with transparent bridging to overcome the limitation of large source routing fields. Accordingly, the present invention provides a transparent source routing TSR for a data network comprising a plurality of network nodes, in particular for sensor networks.

In embodiments, the method and system according to the present invention use a combination of a transparent bridging method for routing of messages in part of the path towards nodes far away from the sink node and a source routing method for routing of messages between nodes close to the sink node. This is based on the observation that in conventional transparent bridging based networks nodes that are close to the sink node require a larger forwarding table than nodes far away, because they have to relay messages from more source nodes. Accordingly, the method according to the present invention uses source routing for nodes that are in proximity to the sink node, thus removing the limit given by the size of the forwarding table. Furthermore, the method according to the present invention additionally uses transparent bridging for the last part of the route for the nodes that are far away from the sink node, thus removing the limit given by the size of the source routing field. For these nodes a size limit of the forwarding tables is not critical because they have to store only a small number of source node entries.

In an embodiment of the method according to the present invention, the source routing information data is updated by each intermediate node during propagation of the forward message via the intermediate node by appending a node address of a respective intermediate node to a source routing data field of the forward message as long as a size of the source routing data field does not exceed a maximum allowed length.

In an embodiment of the method according to the present invention, the transparent bridging information data is updated by each intermediate node during propagation of the forward message via the intermediate node by storing a source node address of a source node of the respective forward message together with a node address of a node from which the intermediate node received the respective forward message as an entry in a forwarding table of the intermediate node.

In an embodiment of the method according to the present invention, the transparent bridging information data is updated by each intermediate node during propagation of the forward message via the intermediate node by storing addresses contained in a source routing field of the respective forward message together with a node address of a node from which the intermediate node received the respective forward message as further entries in a forwarding table of the intermediate node.

In an embodiment of the method according to the present invention, each intermediate node uses source routing information data for routing of the reverse message as long as the source routing information data of the respective reverse message is valid and switches to using the transparent bridging information data stored in the forwarding table of the intermediate node if the source routing information data of the respective reverse message is exhausted.

Accordingly, with the method according to the present invention, an intermediate node implements a processing of source routing information data as well of transparent bridging information data.

In a possible embodiment of the method according to the present invention, the source node is formed by a sensor node transmitting a forward message via at least one intermediate node to a sink node of a sensor network. This message can, for example, comprise sensor data as payload.

In another possible embodiment of the method according to the present invention, the routing of the forward message is performed by a predetermined routing protocol comprising, for example, a collection tree protocol or a gradient routing protocol.

The invention provides a data network comprising a plurality of source nodes and at least one sink node, configured such that a routing of a reverse message from the sink node to a source node via at least one intermediate node of the network is performed by said intermediate node depending on reverse path routing information data, comprising a combination of source routing information data and transparent bridging information data, wherein said reverse path routing information data is constructed during propagation of a forward message from the source node to the sink node via the intermediate nodes.

In a possible embodiment of the data network according to the present invention, the network is further configured such that the source routing information data is updated by each intermediate node during propagation of the forward message via the intermediate node by appending a node address of the respective intermediate node to a source routing data field of the forward message as long as the size of the source routing data field does not exceed a maximum allowable length.

In a possible embodiment of the data network according to the present invention, the network is further configured such that the transparent bridging information data is updated by each intermediate node during propagation of the forward message via the intermediate node by storing a source node address of a source node of the respective forward message together with a node address of a node from which the intermediate node received the respective forward message as an entry in a forwarding table of the intermediate node.

In a possible embodiment of the data network according to the present invention, the network is further configured such that the transparent bridging information data is updated by each intermediate node during propagation of the forward message via the intermediate node by storing the addresses contained in the source routing field of the respective forward message together with a node address of a node from which the intermediate node received the respective forward message as further entries in a forwarding table of the intermediate node.

In a possible embodiment of the data network according to the present invention, the network is further configured such that each intermediate node uses source routing information data for routing of the reverse message as long as the source routing information data of the respective reverse message is valid and switches to using transparent bridging information data stored in the forwarding table of the intermediate node if the source routing information data of the respective reverse message is exhausted.

In an embodiment of the data network according to the present invention, the source nodes are formed by sensor nodes sending sensor data in forward messages to the sink node.

In a possible embodiment of the data network according to the present invention, the sink node is formed by a base station connected to the internet.

In a possible embodiment of the data network according to the present invention, the reverse message comprises control information data for controlling the source nodes.

In a possible embodiment of the data network the data network, comprises wireless links between the nodes. In an alternative embodiment of the data network according to the present invention, the data network comprises wired links between the nodes.

In a possible embodiment of the data network according to the present invention, the nodes are mobile nodes. In an alternative embodiment of the data network according to the present invention, the nodes are not mobile nodes.

The invention further provides a computer program product storing a computer program adapted to perform (i.e. comprising instructions for performing) a method for routing a reverse message from a sink node to a source node via at least one intermediate node of a network depending on reverse path routing information data comprising a combination of source routing information data and transparent bridging information data, wherein the reversed path routing information data is constructed during propagation of a forward message from the source node to the sink node via the intermediate node. The invention may further provide a non-transitory data carrier which stores such a computer program.

The computer program according to the present invention can be performed by a node of a data network, the node comprising execution means such as a microprocessor for executing the computer program.

BRIEF DESCRIPTION OF SEVERAL VIEWS OF THE DRAWINGS

In the following embodiments of the method and network according to the present invention are explained with reference to the enclosed figures.

DETAILED DESCRIPTION OF THE INVENTION

Figure 1:
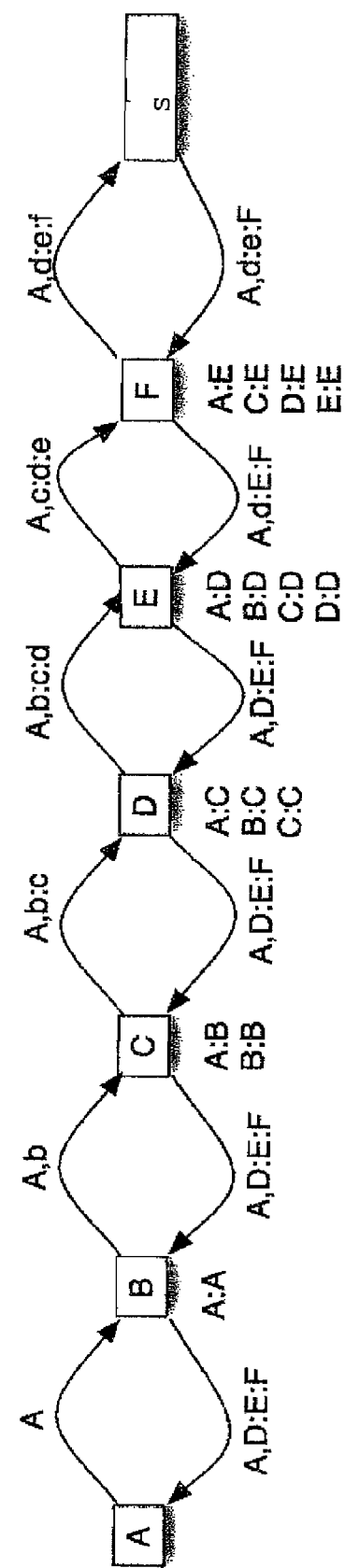
FIG. 1 shows a diagram for illustrating a transparent source routing method according to a possible embodiment of the present invention.

As can be seen from FIG. 1, the data network 1 according to the present invention can comprise a plurality of nodes and, in particular, a plurality of source nodes and at least one sink node. The diagram shown in FIG. 1 illustrates the forwarding of a forward message from a source node A to a sink node S via several intermediate nodes B, C, D, E, F and back-routing of a reverse message from the sink node S via the same intermediate nodes F, E, P, C, B back to the source node A. The source A can, for example, be formed by a sensor node sending a forward message comprising sensor data as payload to the sink node S. The sink node S can send back a reverse message comprising control information data for controlling the source node A. The sink node S can, for example, be formed by a base station connected to the internet. Routing of a reverse message from the sink node to the source node A via the intermediate nodes F, E, D, C, B of the network 1 is performed on the basis of reverse path routing information data. This reverse path routing information data comprises a combination of source routing information data and transparent bridging information data. In the method according to the present invention, the reverse path routing information data is constructed during propagation of a forward message from the source node A to the sink node S via the intermediate nodes B, C, D, E, F.

The source routing information data is updated by each intermediate node B, C, D, E, F during propagation of the forward message via the respective intermediate node by appending a node address of the respective intermediate node to a source routing data field of the forward message, as long as a size of the source routing data field does not exceed a maximum length.

The transparent bridging information data is updated by each intermediate node, B, C, D, E, F during propagation of the forward message via the respective intermediate node by storing the source node address of the source node A of the respective forward message and the addresses contained in the SR field of the respective forward message together with the node address of the preceding intermediate node from which the intermediate node received the respective forward message as entries in a forwarding table of the intermediate node. Accordingly, each intermediate node, B, C, D, E, F comprises a forwarding table to store such entries.

For routing the reverse message originating from the sink node S, each intermediate node B, C, D, E, F uses the source routing information data for routing the reverse message as long as the source routing information data of the respective reverse message is valid. If the source routing information data of the respective reverse message is exhausted, the intermediate node switches to using the transparent bridging information data stored in its forwarding table. Intermediate nodes B, C, D, E, F implement processing of source routing information data and of transparent bridging information data. If the intermediate node receives a forward message that has to be forwarded to the sink node S, it adds the source node's address and the addresses contained in the SR field of the respective forward message together with the address of the sending node into its forwarding table. Furthermore, the intermediate node appends its node address to the end of the source routing SR data field of the forward message. In case that the source routing data field has already reached its maximum allowable length, the intermediate node removes the first address of the source routing field so that it can append its own node address to the end of the source routing data field. In a possible embodiment the maximum allowable length is adjustable.

If the forwarding table of the intermediate node is already full and the intermediate node wishes to add a new entry, it can decide either to replace an old entry by the new entry or to ignore the new entry. In a possible embodiment an intermediate node can decide to replace an entry if the node corresponding to the entry is further away than the one of the new entry.

The method according to the present invention is described in more detail with respect to the exemplary embodiment shown in FIG. 1. In the given example, the source node A can be formed by a sensor node which is sending a forward message to the sink node S, which can be a base station connected to the internet. Intermediate nodes B, C, D, E and F route the forward message by using a known routing algorithm comprising, for instance, a collection tree protocol or a gradient routing protocol. In the given example, the source routing field can only contain three node addresses, i.e. the source routing field of the message is, in the given example, too short to contain all of the source routing information data needed to reach the source node A when performing a reverse routing.

In the given example, the source node A sends a forward message in a first step to intermediate node B. The forward message contains the source address "A" and no source routing information data since it is the first message on the route from the source node A to the sink node.

Intermediate node B adds its node address "b" into the source routing field and forwards the message to the next intermediate node C. Further, intermediate node B stores the address "A" in its forwarding table: "A:A" indicates that A is a direct neighbor node of intermediate node B.

The next intermediate node C appends its address "c" to the end of the source routing field of the message and forwards the message to the next intermediate node D. Intermediate node C further adds A and B to its forwarding table: "A:B" indicates that node A can be reached via node B, and "B:B" indicates that B is a direct neighbor node of intermediate node C. The same applies for the next intermediate node D.

Because the source routing field of the forward message is now full, the next intermediate node E removes "b" and appends its node address "e" to the end of the source routing field of the message. It also stores addresses A, B, C, and D in its forwarding table: "A:D", "B;D", "C:D", "D:D". The same applies for the next intermediate node F in the forward path.

For routing a reverse message, the sink node S uses the source routing information data which it received in the message forwarded by the last intermediate node F to return a reverse message to the source node A. This reverse message to node A contains as destination "A" and the source routing information "d:e:F". The intermediate node F uses the source routing information within the reverse message to forward the reverse message further to the next intermediate node E. This intermediate node E uses the source routing information data within the reverse message to forward the reverse message further to the next intermediate node D. In the given example, the source routing information data within the reverse message is now exhausted. Accordingly, the intermediate node D now switches to using the transparent bridging information data stored in its forwarding table. When consulting its forwarding table node D finds out that it has to give the reverse message further to intermediate node C. The same applies for intermediate nodes C and B. Both nodes detect that the source routing information is exhausted and therefore use the information data stored in their respective forwarding tables to route the reverse message back to node A.

Figure 2:
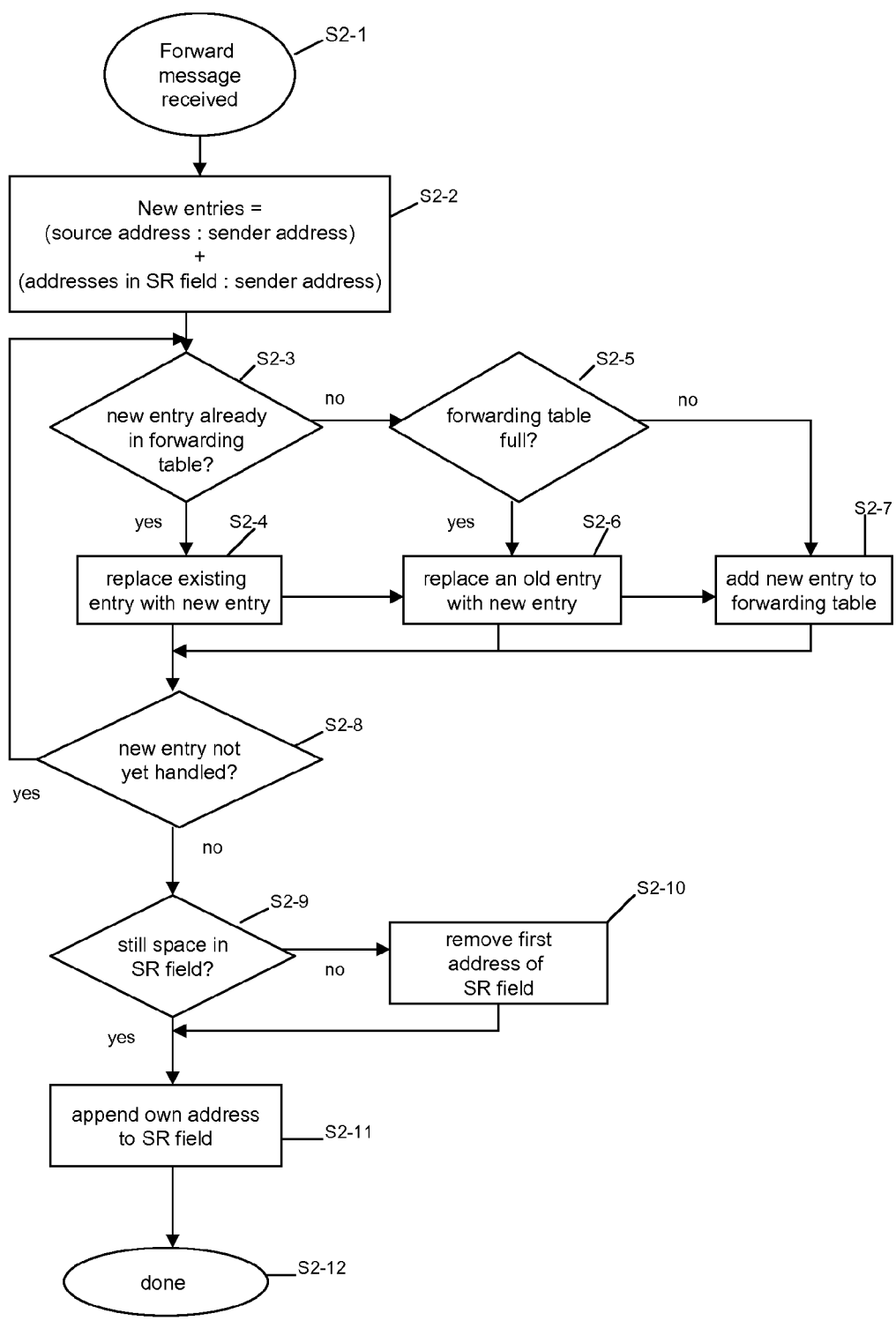
FIG. 2 shows a flowchart for illustrating the processing of a forward message according to a possible embodiment of the method of the present invention.

FIG. 2 shows a flowchart illustrating the processing of a forward message received by an intermediate node. In a first step, S2-1, the intermediate node receives a forward message from another node of the network. In step S2-2 it constructs new entries comprising the source address of the source node and the addresses contained in the SR field of the respective forward message together with the address of the sending node from which it has received the forward message. In a step S2-3 the intermediate node checks whether a just-created new entry is already stored in its forwarding table. If this is the case, it replaces, in step S2-4, the existing entry by the new entry extracted in step S2-2. If the new entry is not already stored in the forwarding table, the intermediate node checks, in step S2-5, whether its forwarding table is already full. If this is the case, the intermediate node replaces, in step S2-6, the old entry in its forwarding table by the new entry extracted in step S2-2. If the forwarding table is not full, a new entry is added to the forwarded table in step S2-7. In a further step S2-8, the intermediate node checks whether there are still new entries that have not yet been handled. If it is the case, it performs step S2-3 and the follow-on steps until all new entries are handled. In a further step S2-9, the intermediate node of the data network 1 checks whether there is still space in the source routing field of the message. If this is not the case, the intermediate node removes the first address of the source routing field in the message in step S2-10. In a further step S2-11, the intermediate node appends its own node address to the source routing field of the message. The subroutine is terminated in step S2-12.

Figure 3:
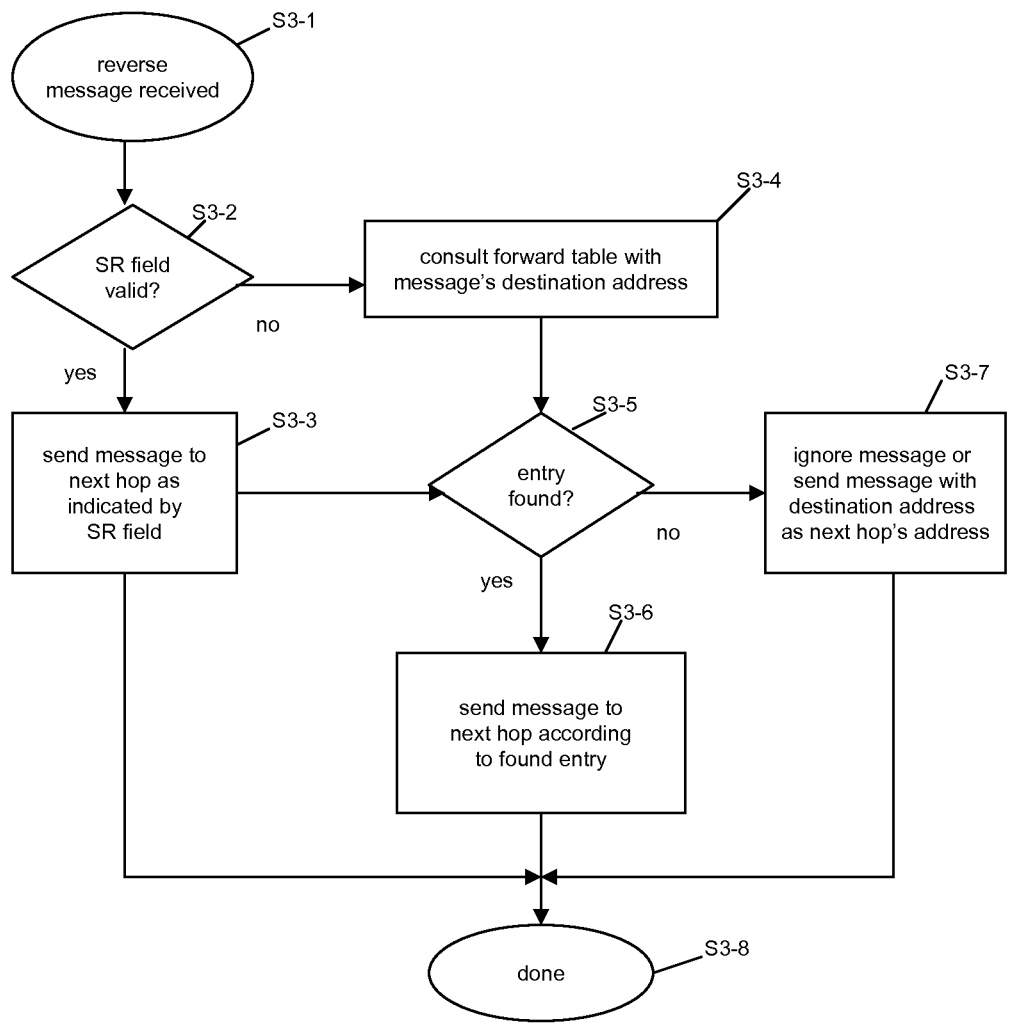
FIG. 3 shows a flowchart of processing a reverse message according to a possible embodiment of the method of the present invention.

FIG. 3 shows a flowchart for illustrating the processing of a reverse message received by a node of the network 1 according to the present invention. In a first step S3-1, the intermediate node receives a reverse message. In the next step S3-2, the intermediate node checks whether the source routing field of the received message is valid. If this is the case, the intermediate node sends the message to the next hop as indicated by the source routing field of the received reverse message in step S3-3. If the source routing field of the received reverse message is not valid, the intermediate node consults its forwarding table with the message's destination address in step S3-4. If the intermediate node detects, in step S3-5, that a corresponding entry exists in its forwarding table, it sends the received reverse message to the next hop according to the entry read from the forwarding table in step S3-6. If no entry could be found in step S3-5, the node can either ignore the message or send the message with the destination address as the next hop's address in steps S3-7. The sub-routine terminates in step S3-8.

Figure 4:
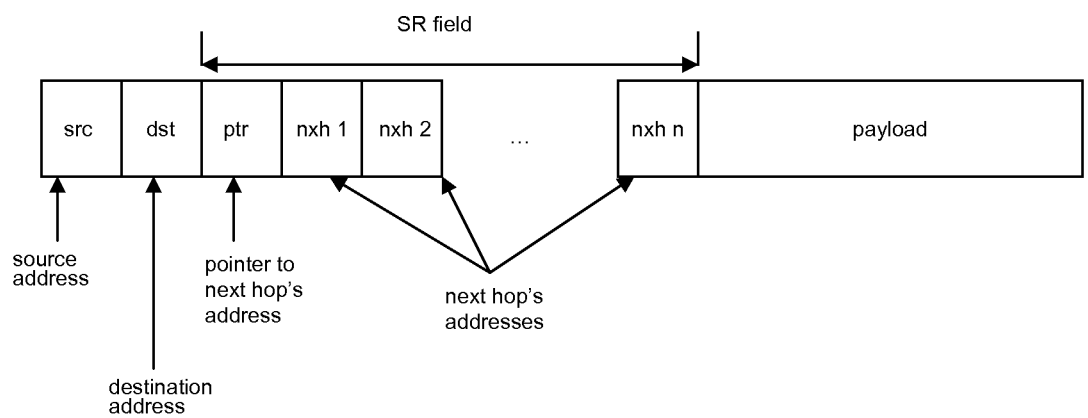
FIG. 4 shows a data diagram for illustrating a possible data format of a message which is employed by the data network according to the present invention.

FIG. 4 shows a diagram for illustrating a possible data structure of a message as employed by the data network 1 according to the present invention. The message comprises a source address data field src, a destination address field dst, a pointer ptr to the next hop's address and next hop's addresses nxh_1 to nxh_n. The source routing data field SR comprises the pointer address field and the addresses to the next hop's addresses. The message further comprises payload data such as sensor data. The method for routing a reverse message can be implemented efficiently in a data network comprising a large number of nodes, in particular a sensor network comprising a very large number of sensor nodes. The method according to the present invention can be adapted for any kind of data network comprising wireless or wired links between the nodes. The nodes of the data network can be either mobile or not mobile nodes.

The invention claimed is:

1. A method for routing a reverse message from a sink node to a source node via at least one intermediate node of a network comprising steps of:
   constructing reverse path routing information data comprising a combination of source routing information data accompanying a forward message, by appending a node address of the respective intermediate node to a source routing data field of the forward message unless a size of the source routing data field exceeds a maximum length and transparent bridging information data stored at a forwarding table in the at least one intermediate node during propagation of a forward message from the source node to the sink node via at least one intermediate node;
   receiving the forward message with reverse path routing information data; and
   routing the reverse message using the reverse path routing information data,
   wherein, when the size of the source routing data field exceeds a maximum length, an intermediate node removes a first address of the source routing data field and appends its node address to the end of the source routing data field.

2. The method according to claim 1 wherein the transparent bridging information data is updated by each intermediate node during propagation of said forward message via each said intermediate node by storing a source node address of the source node of the respective forward message and addresses contained in a source routing field of the respective forward message together with an address of a node from which the intermediate node received the respective forward message as entries in a forwarding table of said intermediate node.

3. The method according to claim 2, wherein each intermediate node uses source routing information data for routing of the reverse message as long as the source routing information data of the respective reverse message is valid and switches to using the transparent bridging information data stored in said forwarding table of said intermediate node if the source routing information data of the respective reverse message is exhausted.

4. The method according to claim 1, wherein the source node comprises a sensor node transmitting a forward message via at least one intermediate node to a sink node of a sensor network.

5. The method according to claim 1, wherein the routing of the forward message is performed by a predetermined routing protocol comprising one of a collection tree protocol and a gradient routing protocol.

6. A node of a data network, comprising a processing device for executing a computer program comprising instructions for causing the node to implement each of the steps of the method according to claim 1.

7. A data network comprising:
   a plurality of source nodes and at least one sink node;
   at least one intermediate node between said plurality of source nodes and the at least one sink node,
   wherein routing of a reverse message from said sink node to a source node via at least one intermediate node of said network is performed by said intermediate node using reverse path routing information data comprising a combination of source routing information data and transparent bridging information data, and wherein said reverse path routing information data is constructed during propagation of a forward message from said source node to said sink node via said intermediate node wherein source routing information data is provided by appending a node address of the respective intermediate node to a source routing data field of the forward message unless a size of the source routing data field exceeds a maximum length and transparent bridging information is stored at a forwarding table in each intermediate node and wherein, when the size of the source routing data field exceeds a maximum length, an intermediate node removes a first address of the source routing data field and appends its node address to the end of the source routing data field.

8. The data network according to claim 7, wherein each intermediate node updates transparent bridging information data during propagation of said forward message via said intermediate node by storing a source node address of the source node and addresses contained in a source routing field of the respective forward message together with a node address of a node from which the intermediate node received the respective forward message as entries in a forwarding table of said intermediate node.

9. The data network according to claim 8, wherein each intermediate node is further configured to:
  use source routing information data for routing of the reverse message as long as the source routing information data of the respective reverse message is valid; and
  switch to using transparent bridging information data stored in said forwarding table of said intermediate node if the source routing information data of the respective reverse message is exhausted.

10. The data network according to claim 7, wherein said source nodes are sensor nodes sending sensor data in forward messages to said sink node.

11. The data network according to claim 7, wherein said sink node is a base station connected to an internet;
  the reverse message comprise control information data for controlling said source nodes; and
  the data network comprises one of wireless, wired or a combination of wireless and wired links between the nodes.

12. The data network according to claim 7, wherein said nodes are one of mobile, not mobile or a combination of mobile and not mobile nodes.

\* \* \* \* \*